United States Patent [19]

Okatsuka et al.

[11] Patent Number: 4,549,056

[45] Date of Patent: Oct. 22, 1985

[54] ELECTROMAGNETIC INDUCTION HEATING APPARATUS CAPABLE OF HEATING NONMAGNETIC COOKING VESSELS

[75] Inventors: Hisashi Okatsuka, Tokyo; Koichi Taniguchi, Inuyama; Toshio Kakizawa, Kuwana, all of Japan

[73] Assignee: Tokyo Shibaura Denki Kabushiki Kaisha, Kawasaki, Japan

[21] Appl. No.: 530,675

[22] Filed: Sep. 9, 1983

[30] Foreign Application Priority Data

| Sep. 13, 1982 | [JP] | Japan | 57-159325 |
| Sep. 13, 1982 | [JP] | Japan | 57-159327 |
| Sep. 13, 1982 | [JP] | Japan | 57-159328 |
| Sep. 13, 1982 | [JP] | Japan | 57-159329 |

[51] Int. Cl.$^4$ ............................................. H05B 6/12
[52] U.S. Cl. .......................... 219/10.77; 219/10.49 R; 219/10.79
[58] Field of Search ............... 219/10.49 R, 10.77, 219/10.79, 10.75, 10.67

[56] References Cited

U.S. PATENT DOCUMENTS

| 1,900,842 | 3/1933 | Northrup | 219/10.71 |
| 3,057,985 | 10/1962 | Biringer | 219/10.41 |
| 3,781,505 | 12/1973 | Steigerwald | 219/10.77 X |
| 3,786,222 | 1/1974 | Harnden, Jr. et al. | 219/10.49 R |
| 3,966,426 | 6/1976 | McCoy et al. | 219/10.79 X |
| 4,013,859 | 3/1977 | Peters, Jr. | 219/10.77 X |
| 4,029,926 | 6/1977 | Austin | 219/10.49 R |
| 4,092,510 | 5/1978 | Kiuchi et al. | 219/10.49 R |
| 4,296,295 | 10/1981 | Kiuchi | 219/10.49 R |
| 4,354,082 | 10/1982 | Tellert et al. | 219/10.49 R |
| 4,356,371 | 10/1982 | Kiuchi et al. | 219/10.49 R |

FOREIGN PATENT DOCUMENTS

| 70525 | 6/1974 | Australia . |
| 82960 | 7/1975 | Australia . |
| 30221 | 11/1977 | Australia . |
| 66686 | 1/1981 | Australia . |
| 2317565 | 10/1973 | Fed. Rep. of Germany . |
| 2559519 | 6/1979 | Fed. Rep. of Germany . |
| 3042525 | 5/1981 | Fed. Rep. of Germany . |
| 3102668 | 12/1981 | Fed. Rep. of Germany . |
| 2259571 | 8/1975 | France . |
| 50-9829 | 1/1975 | Japan . |
| 53-4656 | 2/1978 | Japan . |
| 54-21636 | 2/1979 | Japan . |
| 7204565 | 10/1972 | Netherlands | 219/10.77 |
| 7315616 | 11/1973 | Netherlands . |

Primary Examiner—Philip H. Leung
Attorney, Agent, or Firm—Cushman, Darby & Cushman

[57] ABSTRACT

In an electromagnetic induction heating apparatus, a cooking vessel made of a nonmagnetic metal, which has conventionally been incapable of magnetic inducting heating, is provided adjacent a heating coil which applies an alternating field with a high-frequency of at least 50 kHz. An inverter circuit for supplying the heating coil with a high-frequency current operates in response to an output signal from a detector which automatically detects the magnetic characteristics of the metallic material of the cooking vessel. As the high-frequency magnetic field is applied, a skin effect is produced within the metallic material of the vessel, so that the impedance for the magnetic field of the vessel is substantially fixed without regard to the wall thickness of the vessel.

12 Claims, 12 Drawing Figures

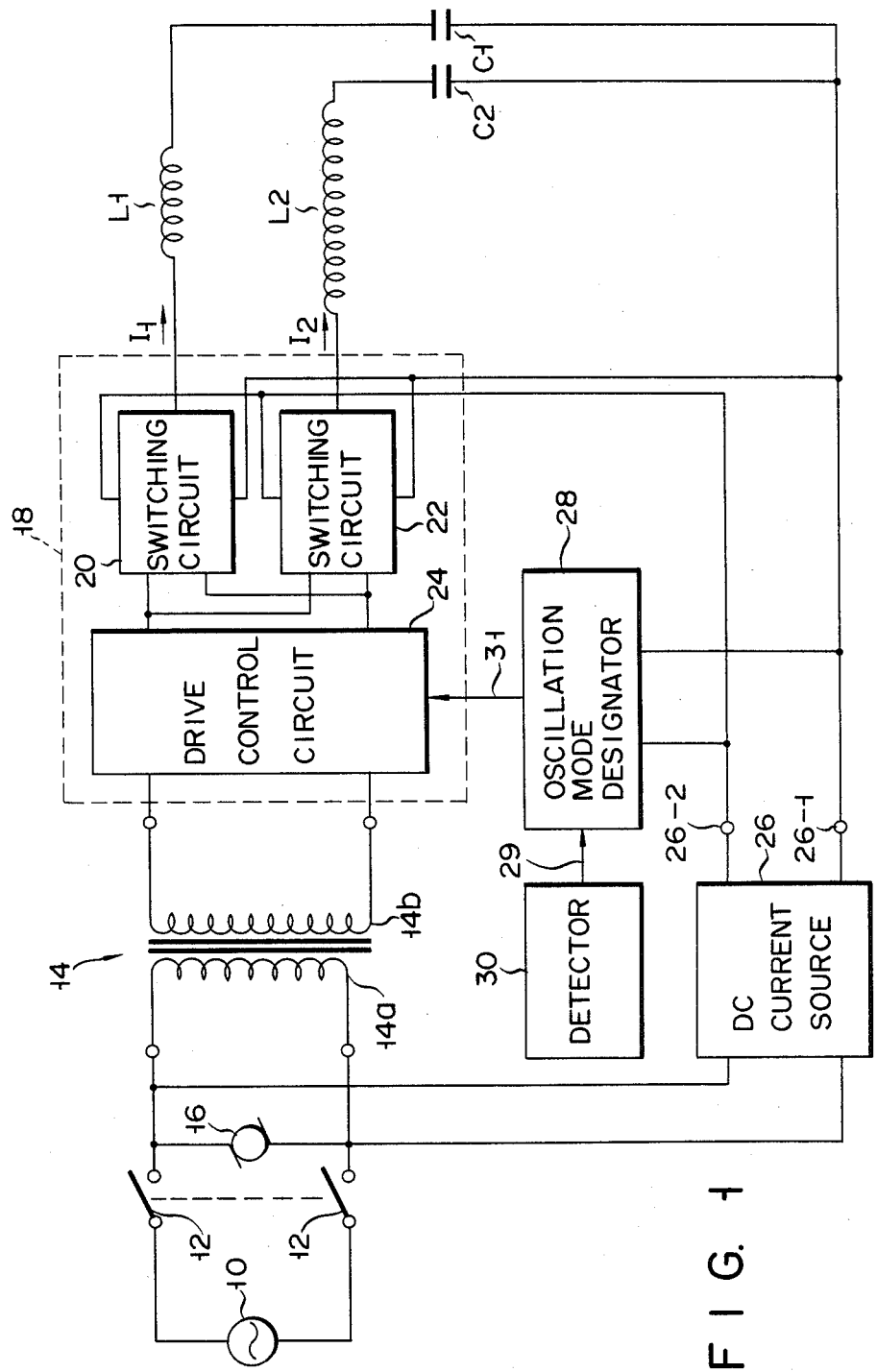
F I G. 1

ELECTROMAGNETIC INDUCTION HEATING APPARATUS CAPABLE OF HEATING NONMAGNETIC COOKING VESSELS

BACKGROUND OF THE INVENTION

The present invention relates in general to an electromagnetic induction heating apparatus and, in more particular, to an electromagnetic induction heating apparatus which generates a high-frequency alternating field for the induction heating of a cooking pot or kettle serving as a load for household use, thereby cooking food contained in the kettle.

In electromagnetic induction cookers, a high frequency current is supplied from an inverter circuit to a heating coil, which generates a high-frequency magnetic field for subjecting a metallic cooking kettle, along with the food contained therein, to induction heating. For effective induction heating of the kettle, the impedance of the metallic kettle serving as the load should preferably be of a given value or more, since, if the impedance is low, the current flowing through the heating coil will increase, resulting in an increase in coil loss. In view of such factors, currently available materials for the cooking kettle are limited to ferromagnetic materials (preferably iron), and the heaters are so designed that induction heating is automatically stopped when a vessel made of a nonmagnetic material, such as aluminum, is used. Thus, in heating food by using one such prior art electromagnetic induction cooker, a cooking kettle needs to be made of iron. If a cooking kettle made of another nonmagnetic material, such as aluminum, is used for this purpose, effective induction heating cannot be achieved and the cooking process requires greater time and power consumption. In fact, vessels made of aluminum or other nonferrous metals (nonmagnetic materials), such as aluminum kettles aluminum pots, etc., are being increasingly used in households, since they have certain advantages. Thus, not being abreast of the varied vessels in current use, conventional electromagnetic induction cookers cannot make the most of their inherent merits as cooking machines.

SUMMARY OF THE INVENTION

It is therefore an object of the present invention to provide a new and improved electromagnetic induction heating apparatus capable of the effective induction heating of a cooking vessel made of a nonmagnetic metallic material such as aluminum.

According to the present invention, if a vessel containing food is made of a nonmagnetic material, an alternating mangetic field with a frequency of a given value or more (at least 50 kHz, preferably 100 kHz or more) and high enough to produce a skin effect inside the nonmagnetic metallic material constituting the vessel is generated and applied to the vessel for the induction heating thereof. The alternating magnetic field causes the impedance of vessel therefore to be made substantially constant without regard to the thickness of the vessel.

BRIEF DESCRIPTION OF THE DRAWINGS

The present invention is best understood with reference to the accompanying drawings, in which:

FIG. 1 is a block diagram showing the general construction of an electromagnetic induction cooker according to one embodiment of the invention;

DETAILED DESCRIPTION OF THE PREFERRED EMBODIMENT

Figure 2:
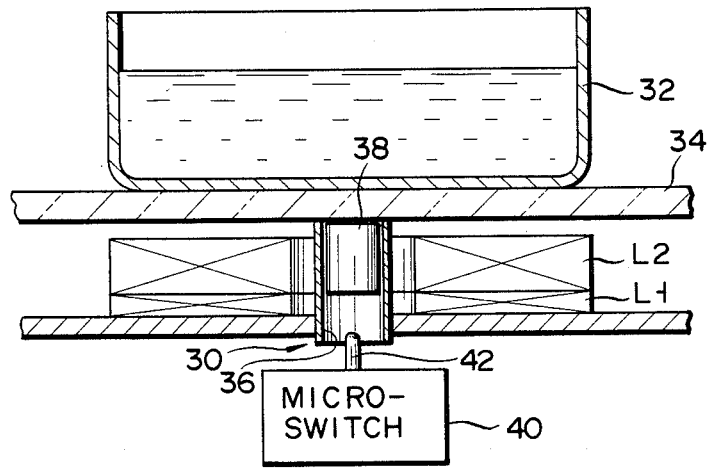
FIG. 2 is a sectional view showing a heating coil section of the electromagnetic induction cooker of FIG. 1 and other members surrounding that section.

FIG. 1 shows an electromagnetic induction cooker according to one embodiment of the present invention which can use both a cooking vessel made of a ferromagnetic material such as iron or stainless steel, and a cooking vessel made of a nonmagnetic material such as aluminum. The apparatus of this embodiment comprises a first heating coil L1 for exclusive induction heating of the cooking vessel made of a ferromagnetic material such as iron or stainless steel, and a second heating coil L2 for exclusive induction heating of the cooking vessel made of a nonmagnetic material such as aluminum. The number of turns of the second heating coil L2 is greater than that of the first heating coil L1.

In FIG. 1, both terminals of an AC power source 10 are connected individually, through power switches 12, to both terminals of a primary winding 14a of a transformer 14. A motor 16 for driving a fan (not shown) for cooling active circuit elements such as transistors is connected to the AC power source 10 through the power switches 12. A secondary winding 14b of the transformer 14 is connected to an inverter circuit 18 which includes two switching circuits 20, 22 each having switching transistors of a prescribed type (e.g., npn type), and a drive control circuit 24 for selectively driving the switching circuits 20, 22. Each of the switching circuits 20, 22 is formed of the so-called SEPP circuit which includes series-connected transistors. The first switching circuit 20 performs a switching operation at a given frequency level, e.g., at 20 kHz, while the second switching circuit 22 carries out a switching operation at a higher frequency level, e.g., at 50 kHz or more, preferably at 100 kHz. In the present embodiment, the second switching circuit 22 uses bipolar transistors for efficient high-frequency switching. The output terminals of the switching circuits 20, 22 are connected to the first and second heating coils L1, L2, respectively. The heating coils L1, L2 are connected to a first output terminal (negative output terminal) 26-1 of a DC current source 26 through resonance capacitors C1, C2, respectively, which constitute a series resonance circuit in conjunction with the heating coils L1, L2. The DC current source 26 is connected to the AC power source 10 through the power switches 12. The DC current source 26 also feeds each of the switching circuits 20, 22.

First and second output terminals 26-1, 26-2 of the DC current source 26 are also connected to an oscillation mode designating circuit 28. The circuit 28 designates one of the two independent heating coils L1 and L2 to be energized, and generates a mode designating signal 31, in response to an output signal 29 from a detector 30 which detects whether a cooking kettle is made of a magnetic material or a nonmagnetic material, depending on the kind of material (iron or aluminum) of the cooking kettle actually used. In response to the signal 31, the drive control circuit 24 selectively drives the first or second switching circuit 20, 22.

FIG. 2 shows a heating table of the cooker of FIG. 1 and other members surrounding said table. A cooking kettle 32 containing liquid food is placed on a heating plate 34 made of heat-resisting glass. The first and second heating coils L1, L2, which are each formed in a loop, are arranged in two layers under the heating plate 34. The mechanical auto-switch 30 is disposed inside a central opening of the superposed annular coils L1, L2. The switch 30 includes a hollow cylindrical switch frame 36 and a permanent magnet 38 capable of vertically moving inside of the frame 36. A normally-closed microswitch 40 is so provided that its actuator knob 42 projects into the lower opening end of the frame 36. If the cooking kettle 32 is made of iron or other magnetic material, the permanent manget 38 is magnetically attracted by the kettle 32 to move upward, and sticks to the bottom of the kettle 32 with the galss plate 34 between them. If the kettle 32 is made of aluminum or other nonmagnetic material, on the other hand, the permanent magnet 38 falls by the force of gravity without being attracted to the kettle 32, thereby pressing the actuator knob 42 of the microswitch 40. As a result, the microswitch 40 is rendered open, or nonconductive. Thus, the permanent magnet 38 and the microswitch 40 constitute the detector 30. If it is detected by the detector 30 that the material of the kettle used in cooking is a magnetic material, then the drive control circuit 24, in response to the signal 31, drives only the first switching circuit 20 to supply the first heating coil L1 with a high-frequency current I₁ at 20 kHz, thereby subjecting the iron vessel to induction heating. If the vessel is made of a nonmagnetic material such as aluminum, the drive control circuit 24 drives only the second switching circuit 22 in response to the signal 31, to supply the second heating coil L2 with a high-frequency current I₂ at 100 kHz, thereby subjecting the aluminum vessel to induction heating.

Figure 3A:
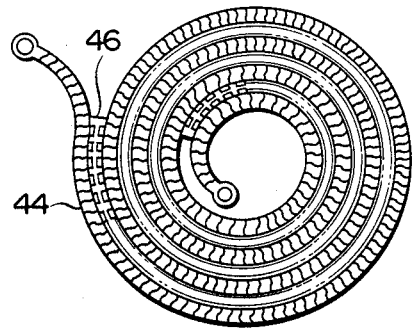
FIGS. 3A to 3C are diagrams illustrating in detail the arrangement of a heating coil used in the cooker of FIG. 1.
Figure 3B:
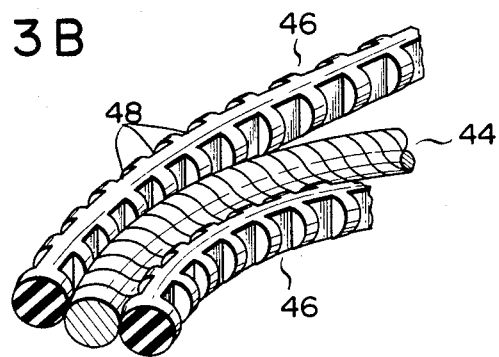
Figure 3C:
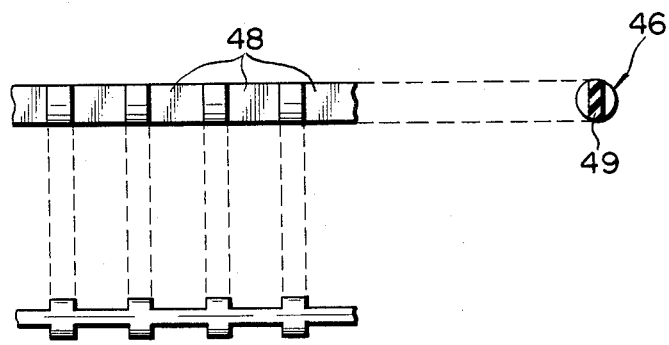

Each of the heating coils L1, L2 is formed so as to have a loop diameter suited to the shape of the cooking kettle 32. Referring now to FIGS. 3A, 3B and 3C, the construction of the second heating coil L2, will be described, by way of example. As shown by the model in FIG. 3A, the heating coil 2 is made by spirally rolling a winding 44 (known to those skilled in the art as a litz wire), which serves to reduce impedance for the heating coil and is formed of a bundle (e.g., 200) of insulated fine copper wires, e.g., of wires with a diameter of from about 0.1 mmφ to 0.16 mmφ (in the prior art, 19 insulated copper wires with a diameter of 0.5 mm were bundled together to make the litz wire). As clearly shown in the enlarged view of FIG. 3B, an insulative wire 46 is wound in the shadow of the spiral winding 44.

The wire diameter of the insulative wire 46 is equal to that of the winding 44. The insulative wire 46 is formed of an electrical insulating material with a good temperature-withstand characteristic and high flexibility, such as filler-stuffed nylon. A number of ventilating notches or recesses 48 are successively formed in both side regions of the insulative wire 46 in contact with the winding 44. FIG. 3C clearly shows the shape of the recesses 48 formed in the insulative wire 46. The insulative wire 46 has a circular cross section in regions other than the regions corresponding to the recesses 48, and a substantially rectangular cross section 49 in the recessed regions. It should be noted that the number of turns of the second coil L2, which is supplied with a current at a high frequency, preferably at 100 kHz or thereabout (about five times as high as the frequency of the current supplied to the first coil L1), is made much greater than that of the first coil L1 for the induction heating of the cooking kettle made of a nonmagnetic material. Therefore, if the two heating coils L1, L2 are constructed in the aforesaid manner, the second heating coil L2 is formed by arranging a plurality of spirally wound litz wires of FIG. 3A in layers, so that the loop diameter of the second heating coil L2 is equal to that of the first heating coil L1, as shown in FIG. 2. A capacitor with a high withstand voltage of several kilovolts is expressly used for the resonance capacitor C2.

The operation of the embodiment of the present invention thus constructed may be described as follows. The detector 30 detects whether the material of the kettle containing food to be cooked and placed on the cooking plate 34 is a ferromagnetic material, such as iron, or a nonmagnetic material, such as aluminum. If the cooking kettle 32 is made of iron, the premanent magnet 38 is attracted thereto to set the actuator knob 42 of the microswitch 40 free, so that the microswitch 40 is closed. In response to this, the oscillation mode designator circuit 28 causes the drive control circuit 24 to energize only the first switching circuit 20. Since the high-frequency current I₁ from the circuit 20 is supplied to the first heating coil L1, an alternating magnetic field at a high frequency of 20 kHz or thereabout is applied to the kettle by a series resonance circuit formed of the coil L1 and the capacitor C1. An eddy current is produced inside the iron plate of the kettle by the high-frequency magnetic field, and the kettle generates heat itself by a current loss based on the eddy current, thereby heating and cooking the food. On the other hand, if the kettle 32 is made of a nonmagnetic material, such as aluminum, the permanent magnet 38 of FIG. 2 falls downward to press the actuator knob 42 of the microswitch 40, thereby rendering the microswitch 40 nonconductive. In response to this, the oscillation mode designator 28 controls the drive control circuit 24 so that the circuit 24 selectively energizes the second switching circuit 22. As a result, the first heating coil L1 stops its function, while the second heating coil L2 receives the high-frequency current I₂ at about 100 kHz and generates a high-frequency magnetic field for induction heating of the aluminum kettle.

The induction heating of a cooking vessel made of aluminum or some other nonmagnetic material, which has conventionally been impossible, can effectively be achieved by producing an alternating field at a high-frequency of 50 kHz or more, preferably about 100 kHz, by means of the second heating coil L2. This process is based on the theory explained below.

Figure 4A:
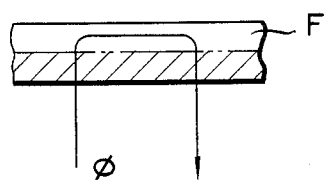
FIGS. 4A and 4B are diagrams illustrating the skin effect produced inside the plate portion of a cooking kettle when a high-frequency magnetic field is applied thereto.
Figure 4B:
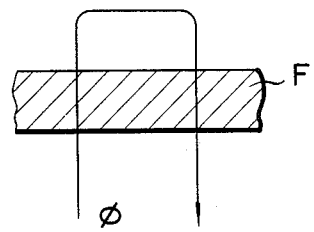

In cooking, it is first necessary that the cooking kettle used have a constant impedance, so that the input for the kettle can be fixed. Prior art cookers use a high-frequency magnetic field at a frequency of about 20 kHz, thereby enabling the use of the cooking kettle made of iron. The iron kettle can be used under such conditions because the iron plate of the kettle produces the skin effect at a frequency of about 20 kHz. The skin effect is a phenomenon such that current flows intensively through a fixed region (hatched portion of FIG. 4A) including the surface of the iron plate F (on the side where magnetic flux $\phi$ is applied). If this effect is produced, the impedance of the iron plate F is kept constant without regard to its thickness, and the given magnetic flux $\phi$ will never leak out. The iron plate F shown in FIG. 4B is not subject to the skin effect. Thus, current flows throughout the entire region of the iron plate F, so that the impedance depends on the thickness, and the given magnetic flux $\phi$ undesirably leaks out.

According to the present invention, the impedance of a cooking vessel made of aluminum is made constant by a special method such that the frequency of the inverter circuit is increased, while allowing for the fact that an aluminum plate is also subject to the skin effect if the frequency level of the high-frequency magnetic field is 50 kHz or more. In this case, no restrictions need be placed on the cooking vessels to be used, and magnetic flux will never permeate the cooking vessle, although the frequency of the inverter circuit needs to be increased. In general, an inverter circuit uses transistors as its switching elements, and its switching speed is limited to some extent. However, owing to the remarkable recent progress in semiconductor technology, bipolar transistors, for example, permit switching operation at a frequency of 100 kHz, while power MOS FET's can perform switching operation at a frequency of 200 kHz to 300 kHz. Thus, the frequency of the inverter circuit can be fully increased by the use of these transistors therein.

According to the results of one experiment, a cooking vessel can enjoy an optimal skin effect when the frequency of the high-frequency magnetic field is at a level of about 100 kHz and the thickness of the aluminum plate of the vessel is 0.5 mm or more. In the present invention, as described above, a high-frequency magnetic field at a frequency of about 100 kHz is used, so that an aluminum cooking vessel can be used in the cooker.

However, these measures are not complete in terms of the actual cooking, leaving several problems unsolved.

The combination of a heating coil and a cooking vessel may be regarded as a transformer; though in such a combination there is a considerable problem concerning the heating efficiency between the primary impedance on the heating coil side and the secondary equivalent impedance on the cooking vessel side.

Figure 5:
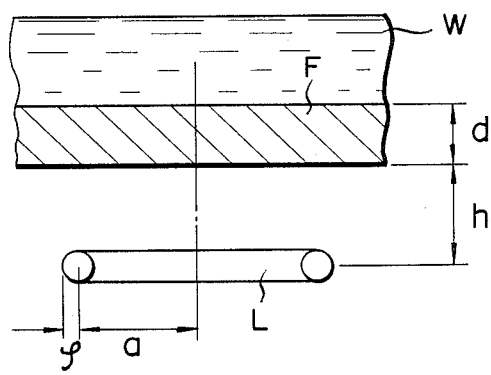
FIG. 5 is a diagram showing several variables used in equations for calculating the primary equivalent impedance of the heating coil obtained when the high-frequency magnetic field is applied.

In calculating the secondary equivalent impedance on the cooking kettle side, the situation is as shown in FIG. 5. As shown in FIG. 5, a coil L is set at a given distance h from a vessel made of metal (iron or aluminum), having a thickness d and containing water W (as a "food" to be cooked). The coil L is formed by winding a copper wire with radius $\phi$ in a single loop with a radius a. The coil L is taken as a model which corresponds to a part of the heating coil L1 or L2.

Using several factors shown in Table below, the vessel-side secondary equivalent impedance R and equivalent inductance L are given as follows:

TABLE

|  | Conductivity $\sigma$(s/m) | Relative Dielectric Constant $\epsilon_r$ | Relative Magnetic Permeability $\mu_s$ |
|---|---|---|---|
| Air | 0 | 1 | 1 |
| Aluminum | $3.636 \times 10^7$ | 1 | 1 |
| Iron | $10^7$ | 1 | 100 |
| Water | $10^{-3}$ | 81 | 1 |

$$R = \omega \cdot \mu_2 \cdot \delta(y - x) \frac{(2 \cdot h^2 + a^2)E(\xi) - 2 \cdot h^2 \cdot K(\xi)}{2 \cdot h \sqrt{h^2 + a^2}} \quad (1)$$

$$L = \mu_2 \cdot \delta\{-(x + y)\} \frac{(2 \cdot h^2 + a^2)E(\xi) - 2 \cdot h^2 \cdot K(\xi)}{2 \cdot h \sqrt{h^2 + a^2}} -$$

$$\mu_0 \frac{(2 \cdot h^2 + a^2)K(\xi) - 2(h^2 + a^2)E(\xi)}{\sqrt{h^2 + a^2}} + a \cdot \mu_0 \left( \ln \frac{8a}{\rho} - 2 \right) \quad (2)$$

$$E(\xi) = \int_0^{\frac{\pi}{2}} \frac{d\theta}{\sqrt{1 - \xi^2 \cdot \sin^2\theta}} \quad (3)$$

$$K(\xi) = \int_0^{\frac{\pi}{2}} \sqrt{1 - \xi^2 \cdot \sin^2\theta} \cdot d\theta \quad (4)$$

$$\xi = \frac{a}{\sqrt{h^2 + a^2}} \quad (5)$$

$$x = \frac{1 - e^{4d/\delta}}{1 + e^{4d/\delta} - e^{2d/\delta} \cdot \cos\frac{2d}{\delta}} \quad (6)$$

and $$y = \frac{e^{2d/\delta} \cdot \sin\frac{2d}{\delta}}{1 + e^{4d/\delta} - e^{2d/\delta} \cdot \cos\frac{2d}{\delta}} \quad (7)$$

Here $E(\xi)$ is a perfect elliptic integral of the first kind, $K(\xi)$ is a perfect elliptic integral of the second kind, f is the frequency of high-frequency magnetic field, $\mu_2$ is the permeability of metal, $\mu_0$ is the permeability of vacuum, $\sigma_2$ is the electric conductivity of metal, and $\delta$ is the skin depth.

If the metallic material is an iron plate, and if the thickness d of the iron plate is 0.5 mm, the frequency f of the high-frequency magnetic field is 20 kHz, the loop radius a of the single-loop coil L is 10 cm, the radius $\phi$ of the coil wire is 0.5 mm, and the distance h between the iron plate and the coil L is 1 cm; then, the secondary equivalent impedance R is $R \approx 5$ m$\Omega$, as may be obtained from Equation (1).

If the metallic material is an aluminum plate, and if the thickness d of which is d=0.5 mm, the frequency f of the high-frequency magnetic field is 100 kHz, the loop radius a of the single-loop coil is 10 cm, the radius $\phi$ of the coil wire is 0.5 mm, and the distance h between the aluminum plate and the coil is 1 cm; then, the secondary equivalent impedance R is $R \approx 0.5$ m$\Omega$.

Thus, although there are some variations, depending on the conductivity and permeability of iron, the secondary equivalent impedance R obtained by use of the aluminum cooking kettle is about one tenth that obtained by use of the iron kettle. Therefore, with the aluminum kettle, the coil loss is so increased as to cause a substantially reduction in heating efficiency.

Figure 6:
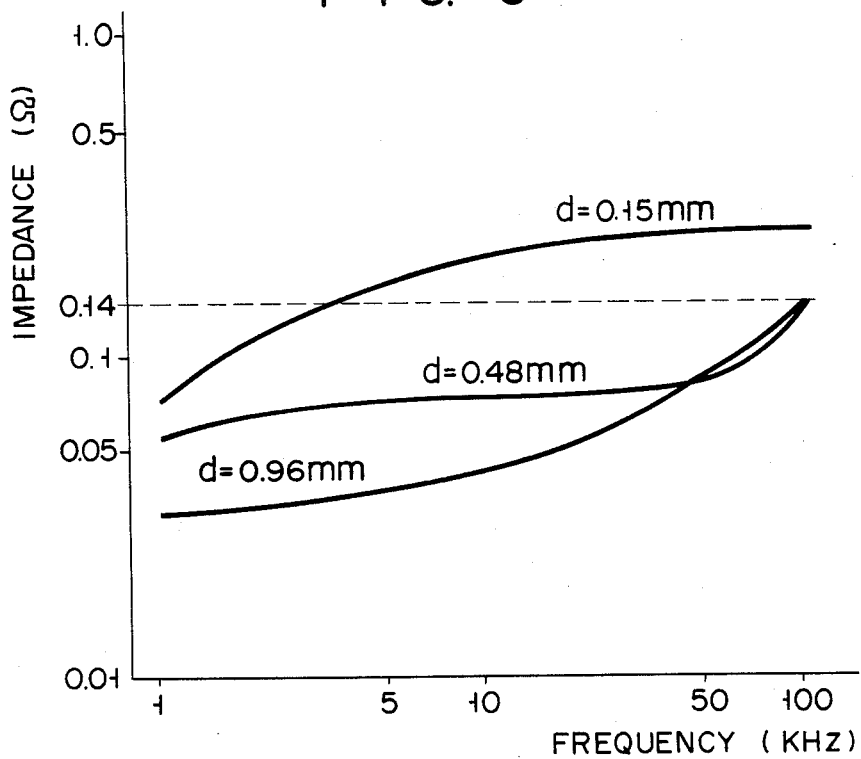
FIG. 6 is a characteristic graph showing the relationships between the frequency of the high-frequency magnetic field applied to a cooking kettle and the impedance of the kettle obtained with use of the wall thickness d of the kettle as a parameter.

Considering the actual number of turns (more than ten) of the heating coil, the secondary equivalent impedance R is calculated with the results being shown in FIG. 6. Thus, if the cooking kettle 32 is made of aluminum, the thickness of the aluminum plate is 0.5 mm or more, and the frequency of the high-frequency magnetic field is 100 kHz, the secondary equivalent impedance R is substantially constant, that is, R=0.14 Ω. On the other hand, the actual impedance of the coil wire of the heating coil L is 0.295Ω, being affected by the skin effect. Besides the heating coil L, transistors and other elements constitute an additional impedance, so that the primary impedance R' is from about 0.4 to 0.5Ω. When the primary impedance is much greater than the secondary impedance, the heating efficiency is extremely low.

To cope with this problem, according to the present invention, a conductor wire (litz wire) formed by bundling a plurality of fine insulated copper wires is used for the heating coil L, so that the impedance (skin resistance) of the heating coil L is so reduced as to decrease the primary impedance.

Due to the existence of an impedance attributed to elements other than the heating coil L, however, the lowering of the heating efficiency cannot be fully checked, as of yet. Thus, in the present invention, the number of turns of the heating coil L2, which generates a high-frequency magnetic field of about 100 kHz, is positively increased, to increase the secondary equivalent impedance. In this case, although an increase in the number of turns of the heating coil L2 is expected, the size of the heating coil L2 is restricted by the size of the cooking kettle and other factors. Accordingly, the heating coils L2 are arranged in a plurality of layers, e.g., in three layers. Thus, the secondary equivalent impedance R, which is proportional to the square of the number of turns of the heating coil, is given by: $R=0.14 \Omega \times 3^2 = 1.26\Omega$. Thus, though the impedance of the heating coil is reduced, the secondary equivalent impedance R is increased, whereby the lowering of the heating efficiency can be thoroughly checked.

The three-layered arrangement of the heating coil requires the following measures. The inductance L calculated for the single-layered heating coil (conventional one) is L=14.4 μH. For the three-layered heating coil, the inductance L, which is also proportional to the square of the number of turns, is: $L=14.4 \mu H \times 3^2 = 130$ μH. For resonance at the frequency of 100 kHz, the capacitance C of the resonance capacitor should be:

$$C = \frac{1}{w^2 \cdot L} = 0.0195 \mu F.$$

If the impedance for elements other than the heating coil is 0.5Ω, then power consumption P is 1.05 kW, efficiency η is 72%, the maximum voltage V cm across the capacitor is 4,050 V, and the maximum current Im flowing through the capacitor is 48.8 A. Under such conditions in the present invention, the capacitor C2 is used expressly for a high withstand voltage of several kilovolts.

According to the aforementioned embodiment, the high-frequency magnetic field applied to the cooking kettle can automatically be set according to the kind of material (iron or aluminum) of the kettle. Accordingly, a user need not be concerned with the material of the cooking vessel or kettle to be used. This is so because the kind of material of the kettle is automatically detected by the detector 30, so that the proper high-frequency current $I_1$ or $I_2$ can be provided in accordance with the output signal from the detector 30, and the proper heating coil L1 or L2 can be selected for use.

The circuit arrangement of the inverter circuit 18 of FIG. 1 may be simplified, since this circuit 18 requires only a single drive control circuit 24 capable of selectively driving one of the two switching circuits 20, 22 which generate the different high-frequency currents.

As shown in FIGS. 3A to 3C, the heating coil L is spirally along with the insulative wire 44 which has a number of recesses 48. Therefore, the coils L1, L2 may be adjusted in diameter to permit the use of a cooking kettle of a relatively large diameter. Thus, a uniform and effective high-frequency magnetic field can be applied to the cooking kettle. Moreover, the magnetic field can be securely prevented from concerntrating on the central portion of the kettle without affecting the whole bottom face of the kettle. The recesses 48 facilitate the wire winding process, and can improve the ventilating efficiency and hence the cooling efficiency of the heating coils. This is particularly expedient for the second heating coil L2 which generates a high-frequency magnetic field of 50 kHz or more, preferably of around 100 kHz.

Figure 7:
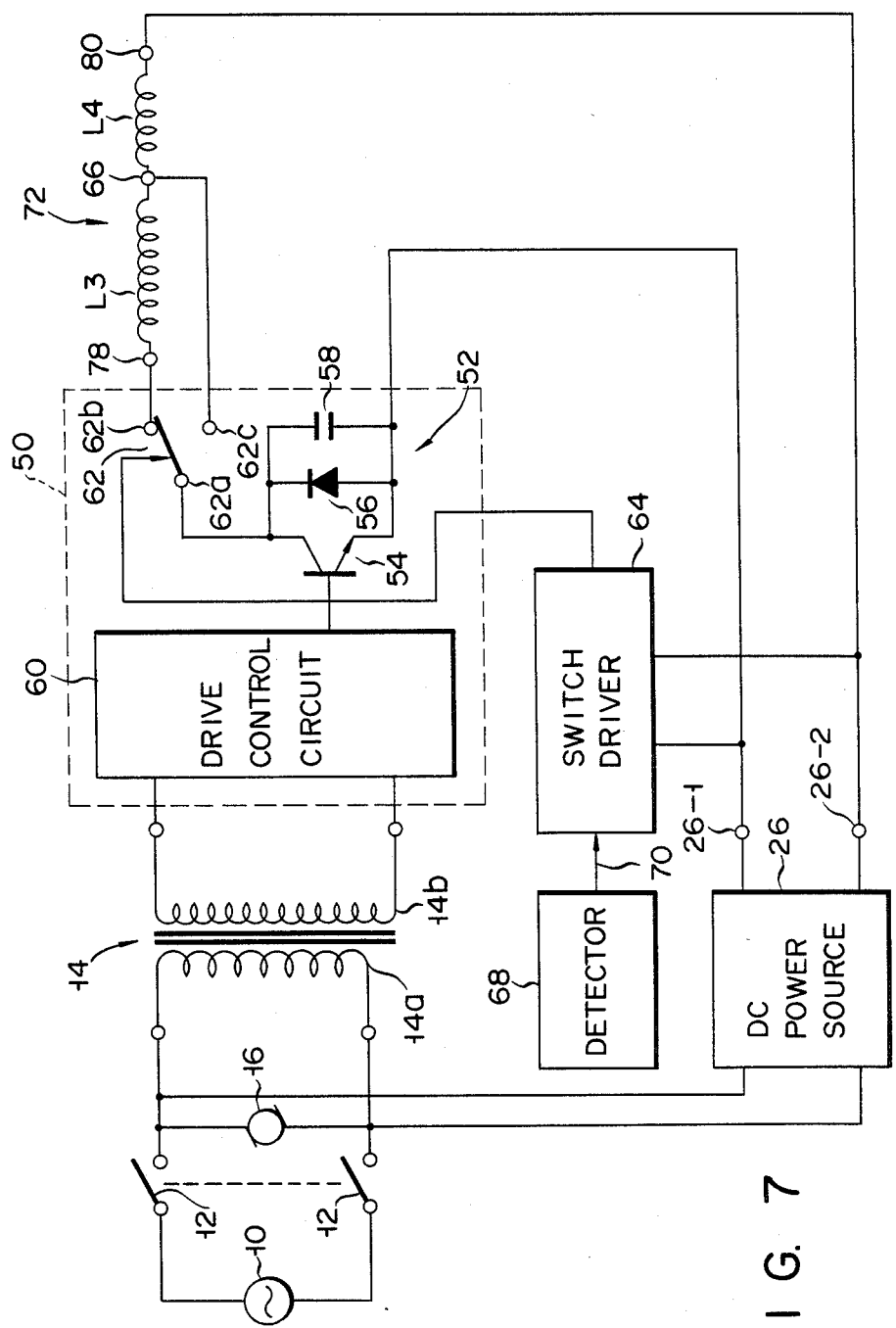
FIG. 7 is a block diagram showing the general construction of an electromagnetic induction cooker according to another embodiment of the invention.

Referring now to FIGS. 7 and 8, an electromagnetic induction cooker according to another embodiment of the invention may be described. In FIG. 7 like reference numerals are used to designate like portions shown in FIG. 1. An inverter circuit 50 provided next to the transformer 14 includes a single-ended inverter 52 formed of an npn type transistor 54, a diode 56 and a resonance capacitor 58; and a drive control circuit 60 for driving the transistor 54 of the inverter 52. The transistor 54 is formed of an MOS transistor of a bipolar transistor. The diode 56 and capacitor 58 are connected in parallel between the emitter and collector of the transistor 54. The collector of the transistor 54 is connected to a movable contact 62a of a change-over switch 62. The movable contact 62a of the switch 62 is selectively short-circuited between first and second fixed contact 62b and 62c by a switch driver 64. Two heating coils L3, L4 are connected in series between the first fixed contact 62b of the switch 62 and a positive output terminal 26-2 of the DC power source 26. A common junction 66 of the coils L3, L4 is connected directly to the second fixed contact 62c of the switch 62. A detector 68, whicn includes, e.g., a Hall element (not shown), detects whether the metal material of the cooking kettle placed on the cooking plate is a magnetic material such as iron or a nonmagnetic one such as aluminum, and supplies the switch driver 64 with a detection signal 70 corresponding to the material. Thus, the driver 64 connectes the movable contact 62a of the switch 62 to the first fixed contact 62b (FIG. 7), if the material of the kettle is found to be iron. If it is indicated that the kettle is made of aluminum, then the switch 62 is driven in such a manner that the movable contact 62a is connected to the second fixed contact 62c.

Figure 8A:
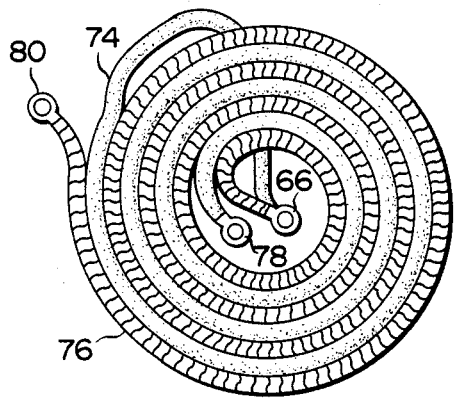
FIGS. 8A and 8B are a plan view and side view, respectively, showing the construction of a heating coil used in the cooker of FIG. 7.
Figure 8B:
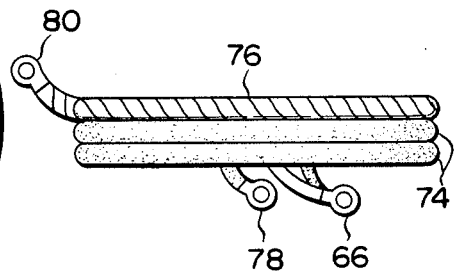

FIGS. 8A and 8B schematically show the construction of a high-frequency magnetic field generating section 72 which includes the two heating coils L3, L4. Two conductor wires 74, 76 (the litz wires as in the first embodiment), each corresponding to the coils L3 and L4, are spirally wound in contact with each other and in an electrically insulated relationship. As shown in FIG. 7, free end 78 of the conductor wire 74 serving as the first coil L3 is connected to the first fixed contact 62b of the switch 62, while a free end 80 of the conductor wire 76 serving as the second coil L4 is connected to the second output terminal 26-2 of the DC power source 26.

According to the second embodiment of the invention constructed in this manner, the number of turns of the heating coils may be suitably adjusted according to the kind of material (magnetic or nonmangetic) used for the cooking kettle. If it is detected that the cooking kettle is made of iron, the first coil L3 is by-passed by shifting the switch 62, and only the second coil L4 serves as an effective heating coil. On the other hand, if the cooking kettle is made of aluminum, both the first and second coils L3, L4 are available as heating coils, and the number of available turns, which equals the sum of the numbers of turns of the two coils L3, L4, is increased. Thus, a high-frequency magnetic field of a proper frequency can always be applied to the cooking kettle, whether iron or aluminum. The joint use of coil L3 provides additional effects, such as overall economy in the use of litz wires, and simplification of the inverter circuit 50 in terms of its configuration.

Although the present invention has been shown and described with respect to particular embodiments, various changes and modifications, which are obvious to a person skilled in the art to which the invention pertains, are deemed to lie within the spirit and scope of the invention. For example, in the aforementioned two embodiments, a high-frequency magnetic field of about 100 kHz is generated for the induction heating of the cooking kettle made of a nonmagnetic material such as aluminum. In the case of an aluminum plate, however, the skin effect to make the impedance of the kettle constant is produced when a high-frequency magnetic field of about 50 kHz is applied, as described above. Accordingly, the aforementioned effects of the present invention may be achieved if the cooking kettle is constructed so that the magnetic field for the induction heating operation has a frequency of 50 kHz or more.

What is claimed is:

1. In a cooking apparatus for the induction heating of cooking utensils or vessels, comprised of solely nonmagnetic metal of at least a predetermined thickness, so as to cook food contained therein, said cooking apparatus comprising:
   plate means for stably supporting one of said nonmagnetic cooking vessels; and
   magnetic heating means, positioned under said plate means, for directly applying to said one vessel an alternating magnetic field with a frequency higher than 50 kHz to produce a skin effect inside said nonmagnetic-metal of said one vessel to inductively heat said one vessel, which skin effect causes the impedance for the magnetic field of said vessel to be substantially constant without regard to the thickness of said vessel, said magnetic heating means comprising a plurality of coil means stacked together for decreasing the primary impedance of said magnetic heating means while increasing the impedance of said one vessel toward that of a ferromagnetic cooking vessel, thereby improving the heating efficiency of said cooking apparatus while inductively heating said nonmagnetic-metal vessel.

2. An apparatus according to claim 1, wherein said predetermined thickness substantially corresponds to 0.5 mm, and said alternating magnetic field frequency is higher than 100 kHz.

3. An apparatus according to claim 2, wherein said magnetic heating means comprises inverter means for producing a high-frequency current of a frequency the same as said magnetic field frequency, said inverter means including semiconductor switching elements.

4. An apparatus according to claim 3, wherein each of said coil means comprises:
   a wire body spirally wound within a diameter and defining a spiral gap space, said body being formed of a plurality of conductive wires insulated from one another; and
   an electrical insulative wire wound spirally in said spiral gap space of said wire body so as to fill said spiral gap space and thereby enlarge the diameter of said conductive wire body to prevent partial concentration of said high-frequency magnetic field on said nonmagnetic cooking vessel, thereby improving uniformity of the application of said magnetic field to said vessel.

5. An apparatus according to claim 4, wherein said electrical insulative wire has lateral faces in contact with said conductive wire body, said lateral faces having a plurality of recesses formed therein to thereby improve the air-ventilating efficiency of said conductive wire body.

6. A cooking apparatus for the induction heating of food contained in a metallic cooking vessel made of a ferromagnetic metallic material or a nonmagnetic metallic material, said cooking apparatus comprising:
   plate means for stably supporting one of the ferromagnetic and nonmagnetic cooking vessels;
   (b) detector means for detecting whether said one supported vessel is ferromagnetic or nonmagnetic and for outputting signals indicative thereof; and
   (c) magnetic heating means, positioned under said plate means and responsive to said output signals of said detector means, for generating a first alternating magnetic field with a frequency lower than 50 kHz for application to a detected ferromagnetic vessel, and for generating a second alternating magnetic field with a frequency higher than at least 100 kHz for directly applying said second magnetic field to a detected nonmagnetic cooking vessel to produce a skin effect inside the nonmagnetic material constituting said nonmagnetic vessel, thereby making the impedance for the magnetic field of said nonmagnetic vessel substantially constant without regard to its thickness, wherein said magnetic heating means includes a plurality of coil means, stacked together and operative to emanate said generated magnetic fields, for causing the primary impedance of said magnetic heating means during application of said second magnetic field to said nonmagnetic vessel to be decreased while causing the impedance of said nonmagnetic vessel to increase so as to approach that of the ferromagnetic cooking vessel, thereby improving the heating efficiency of said cooking apparatus while heating said nonmagnetic vessel.

7. The apparatus according to claim 6, wherein when said supported vessel is made of a material from among a group of nonmagnetic metals including aluminum, said magnetic heating means applies said second alternating field to said supported vessel and produces a skin effect within the nonmagnetic metal so that the magnetic flux of said second alternating field concentrates on an internal region of said nonmagnetic metal at a given depth from the surface thereof, thereby substantially fixing the impedance for said magnetic field of said supported vessel without regard to the thickness of said supported vessel.

8. The apparatus according to claim 7, wherein said magnetic heating means generates said second alternating field so that said alternating field has a frequency of more than 100 kHz.

9. The apparatus according to claim 7, wherein said magnetic heating means comprises:

inverter means, connected to said detector means, for selectively generating a first high-frequency current and a second high-frequency current with a frequency higher than that of said first high-frequency current in response to said output signal from said detector means; and wherein said plurality of coil means are operatively connected to said inverter means and selectively receive said first and second high-frequency currents to selectively generate said first and second alternating magnetic fields and thereby apply said fields uniformly to at least a bottom portion of said supported vessel.

10. The apparatus according to claim 9, wherein said plurality of coil means includes:

a first coil having a first number of turns and receiving said first high-frequency current; and a second coil having a second number of turns greater than said first number of turns and receiving said second high-frequency current alternately with respect to said first coil.

11. The apparatus according to claim 10, wherein said second coil includes:

a conductive wire wound spirally to define a spiral gap space therebetween; and an electrical insulative wire wound spirally in the spiral gap space of said conductive wire so as to fill said spiral gap space, said insulative wire having lateral faces in contact with said conductive wire and a plurality of recesses formed in said lateral faces, thereby allowing for ventilation to accelerate air cooling of said conductive wire.

12. The apparatus according to claim 9, wherein said plurality of coil means includes:

a plurality of coils each having a predetermined number of turns; and coil connection changing means for changing the connections between said coils, thereby selectively changing the gross number of turns of said coils between first and second number of turns corresponding to said first and second high-frequency currents, respectively.

* * * * *